June 13, 1967     E. O. FRYE ETAL     3,325,644
SWITCHING TYPE RADIOMETER HAVING VARIABLE DUTY CYCLE
Filed Nov. 29, 1963
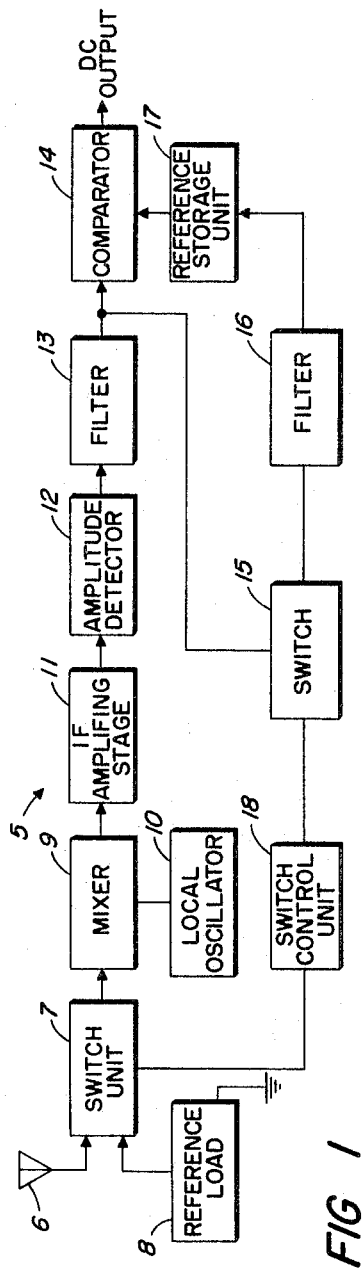
FIG 1
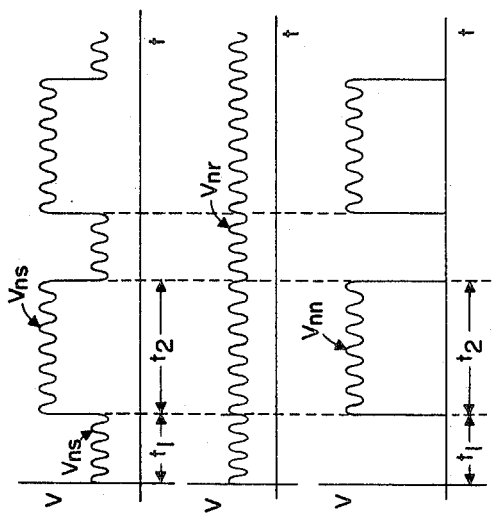
FIG 2
FIG 3
FIG 4
INVENTORS
EUGENE O. FRYE
DAVID M. HODGIN
ROBERT D. TOLLEFSON
BY *Moody and Harris*
ATTORNEYS United States Patent Office 3,325,644
Patented June 13, 1967

3,325,644
SWITCHING TYPE RADIOMETER HAVING
VARIABLE DUTY CYCLE
Eugene O. Frye, Marion, and David M. Hodgin, Cedar
Rapids, Iowa, and Robert D. Tollefson, Richardson,
Tex., assignors to Collins Radio Company, Cedar
Rapids, Iowa, a corporation of Iowa
Filed Nov. 29, 1963, Ser. No. 326,752
5 Claims. (Cl. 250—83.3)

ABSTRACT OF THE DISCLOSURE

This invention describes an improved radiometer of switching type having a reference load and a reference storage unit. A reference signal is automatically coupled to the reference storage unit when a detector forming part of the system is connected with the reference load. A comparator receives the output of the detector and the storage unit and automatically cancels background receiver noise when the detector is later connected to an antenna. The switching of the reference signal and detector output to the comparator is accomplished by a switch control utilizing a preselected time sequence of switching.

This invention relates to a radiometer receiver, and more particularly to a radiometer receiver of the switching type having a variable duty cycle.

The radiometer receiver is a device designed to measure thermal radiation. One of the earlier devised and now better known methods for accomplishing this result is to mount a plurality of paddles, having one side white and the other black, on a rotatable shaft. In the presence of light, the shaft is rotated due to the fact that the white side reflects light while the black side absorbs light, and the speed of rotation is used as an indication of the amount of thermal radiation.

This rather simple type of radiometer was, of course, not the answer for most practical purposes, and the microwave and infrared radiometers were later developed. Although the microwave type of radiometer has been used primarily for radio astronomy to date, the possibility of use of this type of radiometer for other purposes has been seriously considered, as, for example, use of this type of radiometer in lieu of the more conventional active radar for such purposes as passive detection, navigation, or mapping.

Since thermal radiation produces a relatively small amount of noise-like radio frequency power at the antenna of a microwave radiometer, this power is commonly buried in the much larger noise background that originates in the receiver circuitry. It is therefore obviously necessary that the receiver background noise be cancelled in some manner in order to obtain intelligence from the power captured by the antenna due to thermal radiation. This cancellation removes only the average background level originating in the reeciver circuitry, leaving a rapidly fluctuating noise-like signal. This signal must then be integrated or averaged over some period of time before the level due to the desired signal can be estimated.

It has been found that, although the noise background is typically orders of magnitude larger than the intelligence signal received at the antenna, the gain and noise figure stability of modern receivers is such that the average value of the received output due to the noise background remains relatively constant. Utilizing this fact, a number of cancelling schemes have heretofore been devised for eliminating a large portion of the receiver noise from the final output signal. Accuracy of measurement, as would be expected, depends upon the accuracy of balancing, or otherwise cancelling, of the receiver noise background.

One type of radiometer receiver that has been utilized is the D.C. type radiometer. In this type of radiometer, an amplitude detector is alternately connected through receiver circuitry with the antenna and a reference load, and a reference temperature is stored as a voltage in a storage unit, such as a potentiometer or capacitor, whenever the detector is connected with the reference load. The output from this storage unit is then coupled to a comparator along with the output of the amplitude detector to cancel the receiver noise during the period when the detector is conected with the antenna. The output of this type of radiometer is proportional to the temperature difference between the reference load and the effective antenna temperature. While the D.C. type radiometer has good sensitivity, it has serious limitations, due, at least in part, to the fact that this type of radiometer requires occasional manual referencing to minimize errors due to receiver drift.

The radiometer receiver of the switching type that has been utilized heretofore is the Dicke type radiometer. This type of radiometer differs from the D.C. type radiometer in that the receiver input is switched between reference and load at a rate much faster than the data rate and the detected and amplified receiver output is coupled to a phase detector driven in synchronism with the switching rate. The D.C. output signal from the Dickie type radiometer is proportional to the temperature difference between reference load and antenna wherein the phase detector acts to automatically subtract the background noise of the receiver. While this type of radiometer has an obvious advantage over the D.C. type radiometer in that background noise cancellation is automatic and nearly independent of slow receiver output drifts, it has a serious disadvantage in that there is a two-to-one decrease in sensitivity from the D.C. radiometer.

It is therefore an object of this invention to provide an improved radiometer receiver of the switching type capable of automatic background noise cancellation and yet providing good sensitivity.

More particularly, it is an object of this invention to provide an improved radiometer receiver of the switching type that attains the advantages of both the D.C. type radiometer and the Dicke type radiometer without incorporating the disadvantages of each.

It is another object of this invention to provide an improved radiometer of the switching type wherein a reference signal is automatically coupled to a reference storage unit when the detector is connected with the reference load, and wherein a comparator receiving the output of the detector and said storage unit automatically cancels background receiver noise when the detector is later connected with an antenna.

Two basic modes of operation of the improved radiometer of this invention are possible. The first involves a desired data acquisition rate that is fast compared to the length of the individual periods allowable for determination of the receiver background level, whereas the second mode allows operation when the background sampling interval is short compared to the desired data acquisition rate. In the former case, the mean of each individual background sample period is used for background cancellation in the subsequent data acquisition period. For the latter case, as many separate background samples are averaged or integrated as are necessary to yield the desired results.

It is therefore another object of this invention to provide an improved radiometer capable of opreation in more than one basic mode. For passive detection, navigation, or mapping purposes, antennas of the scanning type require a long scan time compared to a rather short flyback or other switching time. In order to gain a maximum of available information, it is, of course, desirable for the antenna to be connected to the radiometer receiver during each scan and the reference load connected through the receiver circuitry only during the short flyback or other switching period. Existing switching radiometers, however, operate best at 50% duty cycles (i.e., when connected to the antenna one-half of the time and to the reference load the other half of the time) and hence are not adequate to accomplish this purpose.

It is therefore another object of this invention to provide an improved radiometer receiver of the switching type having a variable duty cycle whereby the antenna is switched into the receiver circuit for a greater period of time than is the reference load.

It is still another object of this invention to provide an improved radiometer receiver for use in passive detection utilizing a scanning type antenna, said radiometer receiver including switching means for connecting the antenna to the receiver circuitry only during the scanning period and for connecting the reference load to the receiver circuitry only during the flyback or other switching time whereby lost information is kept to a minimum and overall sensitivity is enhanced.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be included as come within the scope of the claims.

The accompanying drawing illustrates one complete example of the embodiment of the invention according to the best mode so far devised for the practical application of the principles thereof, and in which:

FIGURE 1 is a block diagram of the radiometer receiver of this invention;

FIGURE 2 is an illustration of a typical waveform that may appear at the output of the filter following the detector;

FIGURE 3 is an illustration of a typical waveform that may appear at the output of the reference storage unit; and FIGURE 4 is an illustration of a typical waveform that may appear at the output of the comparator.

Referring now more particularly to the drawings, the numeral 5 indicates generally the radiometer receiver of this invention. As shown in FIGURE 1, this radiometer includes an antenna 6 for receiving the low power noise-like radio frequency signal commonly associated with thermal radiation. Antenna 6 is connected to a conventional switching unit 7, which unit is also connected to one end of a conventional reference load 8 (the other end of which is shown grounded).

Switching unit 7 alternately connects the antenna and the reference load to the remainder of the receiver circuitry, and may be conventional, including, for example, a ferrite switch. The output of switching unit 7 is coupled to conventional mixer 9, which mixer also receives an input from conventional local oscillator 10. The purpose of mixer 9 is, of course, to reduce the input signal to a predetermined I-F frequency. It is to be realized, of course, that the receiver circuitry could be of the TRF type, if desired, and that this invention is not meant to be limited to receiver circuitry of the superheterodyne type.

The output from mixer 9 is coupled through conventional I-F amplifier stage 11 to conventional amplitude detector 12. The D.-C. output from detector 12 is then coupled through conventional filter 13 (the output of which is shown by the typical waveform of FIGURE 2) to a conventional D.-C. comparison means 14 and also to a conventional switch 15.

Switch 15 is connected between filter 13 and a second conventional filter 16. The output of filter 16 is connected to conventional reference storage unit 17, which unit supplies the second input to comparator 14. The reference storage unit stores the mean signal obtained during each reference interval until the next reference interval. This mean voltage is coupled to comparator 14 along with the incoming signal where it is subtracted from the incoming signal. The resulting output signal from comparator 14 is, therefore, a D.-C. signal from which the receiver background level has been automatically cancelled (as shown by the typical waveform of FIGURE 3).

Switches 7 and 15 are controlled by means of a conventional switch control unit 18, such as, for example, a clock, so that when switch 7 connects the reference load to the receiver circuitry, switch 15 is closed to allow the output from filter 13 to be coupled through filter 16 to reference storage unit 17. When switch 7 then connects the antenna to the remainder of the switching circuitry, switch 15 is opened so that the output from filter 13 is blocked from filter 16 and storage unit 17.

It is the purpose of switch control unit 18 to not only control the rate of switching, but to also determine the duty cycle. Thus, when utilized with a scanning type antenna, the reference load is connected to the receiver circuitry for only a short flyback period so that the antenna captures a maximum amount of information. A clock, or similar type of programmer, can be adjusted, as would be obvious to one skilled in the art, to vary the duty cycle, or time periods allotted, to achieve the desired end.

The instantaneous noise voltage at the output of comparator 14 (designated hereinafter as $V_{nn}$) (see FIGURE 4) is the instantaneous noise voltages appearing at the output of filter 13 (designated hereinafter as $V_{ns}$) (see FIGURE 2) less the noise voltages appearing at the output of reference storage unit 17 (designated hereinafter as $V_{nr}$) (see FIGURE 3), which is due to errors in the estimate of the reference level. Considering these noises to be statistically independent, the RMS value of $V_{nn}$ can be said to be:

$$V_{nn}(\text{rms}) = \sqrt{[V_{ns}(\text{rms})]^2 + [V_{nr}(\text{rms})]^2} \qquad (1)$$

From Equation 1, it can be seen that if the instantaneous reference noise $V_{nr}$ can be kept negligible, the temperature sensitivity of the radiometer of this invention can be made to approach that of the D.C. type radiometer while at the same time overcoming the limitations of this type of radiometer.

It is to be noted that the duty factor of the switching does not influence the temperature sensitivity, but does directly affect the average rate at which temperature information can be gathered (no antenna temperatures can be measured during the reference intervals).

To a first approximation, the time interval between independent samples of the antenna or reference temperatures is equal to about three times the time constant of the narrowest filter ahead of the sampling point. Thus, independent samples of the reference and antenna temperatures become available, when each is connected to the receiver circuitry, at a rate equal to $1/3T_1$ per second, where $T_1$ is equal to the time constant of filter 13.

To estimate the mean values of a signal composed of an average component plus noise from a number of independent samples, the error or noise, on the estimate will be dependent upon the number of samples taken.

The noise level voltage on the estimate of the reference temperature ($V_{nr}$) is related to the basic filter noise voltage ($V_{ns}$) and the number of independent samples taken, designated hereinafter as $N_s$ in the following manner:

$$V_{nr}(\text{rms}) \approx \frac{V_{ns}(\text{rms})}{\sqrt{N_s}} \qquad (2)$$

From Equation 2, it can be seen that reduction of the reference noise level depends, in great measure, upon taking the mean of a large number of independent reference noise samples. Fortunately, in modern receivers of good design, the mean background noise level can be expected to vary with time orders of magnitude more slowly than the varying signal from the antenna. As a consequence, the reference level determination can be made much more accurately than the signal level determination and can be enhanced additionally by making the reference interval ($t_1$ as indicated in FIGURE 2) equal to a number of time constants ($T_1$) of filter 13. Many independent samples of the reference can be taken, and the degrading effects of reference noise on the desired output can thereby be rendered negligible. Should the reference period not contain sufficient samples, however, then the radiometer must operate in its second possible mode to store the results of several sampling intervals, after which the mean is estimated therefrom. Storage means 17 must, of course, be modified, as would be obvious to one skilled in the art, when operation in the second mode is desired, so that data is cumulatively stored for a number of sampling intervals and the mean coupled to comparator 14.

It has also been found that the integration time constant ($T_2$) of filter 16 for the reference voltage should be about three to four times that of the integration time constant ($T_1$) of filter 13 for most applications. If the threshold noise limits performance, however, then this factor should be increased, as for example, to sixteen times. It must be remembered, however, that the reference time interval ($t_1$) to a first approximation, determines the information rate of the radiometer and since it is desirable to collect as many independent samples of the antenna temperature as possible during a scanning period, the time spent in sampling the reference should be generally minimized consistent with the noise contributions.

If the reference is measured for only a short period of time compared to the antenna signal measuring interval ($t_2$ as indicated in FIGURE 2), this reduces the amount of lost information and allows for a low frequency switching rate and a high data rate system, and allows the overall sensitivity performance of the radiometer to approach the sensitivity of a DC type radiometer.

In view of the foregoing, it should be obvious to those skilled in the art that this invention provides an improved radiometer receiver having good sensitivity and a variable duty cycle allowing use of a low frequency switching rate in a high data rate system.

What is claimed as our invention is:

1. A radiometer receiver of the switching type, said radiometer receiver comprising: antenna means; a reference load; detector means; first switching means for alternately connecting said detecting means with said antenna means and said reference load; a reference storage unit; second switching means for connecting the output of said detector means with said reference storage unit; switch control means for controlling said first and second switching means whereby the output of said detector means is connected to said reference storage unit only when said detector means is also connected with said reference load; and comparator means for receiving the output from said detector means and the output from said reference storage unit and automatically cancelling the background noise level originating in said receiver.

2. The radiometer receiver of claim 1 wherein said switch control means establishes a variable duty cycle such that said antenna means may be connected with said detector means for a much greater period of time than is said reference load.

3. A radiometer receiver of the switching type, said receiver comprising: antenna means; a reference load; detector means; first switching means for alternately connecting said detector means with said antenna means and said reference load; a first filter connected to said detector means; a second filter having an effective time constant much longer than that of said first filter; a reference storage unit connected to said second filter; second switching means connected between said first and second filters; switch control means for controlling said first and second switching means whereby the output of said detector means is coupled through said first and second filters to said reference storage unit only when said detector means is also connected with said reference load; and comparator means for receiving the output from said first filter and the output from said reference storage unit and automatically cancelling the background noise level originating in said receiver.

4. The radiometer receiver of claim 3 wherein the time constant of said second filter is at least three times that of said first filter.

5. A radiometer receiver for use with thermal targets, said radiometer receiver comprising: antenna means to repeatedly scan a predetermined sector to gather thermal information, said antenna means having a short non-data gathering period following each scan; a reference load; detecting means; first switching means for alternately connecting said detecting means with said antenna means and said reference load; a first filter receiving the output of said detecting means; a second filter having a long time constant relative to said first filter; a reference storage unit connected to said second filter; second switching means between said filters; switch control means for controlling said first and second switching means so that said first switch means connects said reference load with said detecting means while said second switching means connects said filters to allow signals to be passed from said first filter to said second filter, said switch control means causing said detecting means to be connected with said antenna means during each scan of said antenna and with said reference load during said non-data gathering period following each said scan, the time interval of each non-data gathering period being long compared with the time constant of said first filter; and comparator means for receiving the output from said first filter and the output from said reference storage unit and automatically cancelling the noise level originating in said receiver.

References Cited

UNITED STATES PATENTS 3,167,714  1/1965  Seling _____ 325—363

KATHLEEN H. CLAFFY, *Primary Examiner.*

A. H. GESS, *Assistant Examiner.*